(12) United States Patent
Zhang

(10) Patent No.: US 8,904,488 B2
(45) Date of Patent: Dec. 2, 2014

(54) MANAGING ONLINE SHOP USING INSTANT MESSAGING SYSTEM

(75) Inventor: Jian Zhang, Hangzhou (CN)

(73) Assignee: Alibaba Group Holding Limited, Grand Cayman, KY (US)

( * ) Notice: Subject to any disclaimer, the term of this patent is extended or adjusted under 35 U.S.C. 154(b) by 508 days.

(21) Appl. No.: 12/599,029

(22) PCT Filed: Jan. 23, 2009

(86) PCT No.: PCT/US2009/031871
§ 371 (c)(1),
(2), (4) Date: Nov. 5, 2009

(87) PCT Pub. No.: WO2009/094567
PCT Pub. Date: Jul. 30, 2009

(65) Prior Publication Data
US 2010/0138901 A1 Jun. 3, 2010

(30) Foreign Application Priority Data

Jan. 23, 2008 (CN) .......................... 2008 1 0002793

(51) Int. Cl.
*H04L 9/32* (2006.01)
*G06F 21/00* (2013.01)
*G06Q 30/06* (2012.01)

(52) U.S. Cl.
CPC ..................................... *G06Q 30/06* (2013.01)
USPC .......... 726/4; 726/2; 726/5; 726/6; 705/26.62; 705/26.41; 705/14.36; 705/14.41; 705/14.67

(58) Field of Classification Search
CPC ..................................................... G06Q 30/06
USPC ................... 726/2, 4, 7; 705/14.61, 44, 26.1
See application file for complete search history.

(56) References Cited

U.S. PATENT DOCUMENTS

2002/0004780 A1* 1/2002 Mizuta ............................ 705/39
2002/0023023 A1* 2/2002 Borecki et al. .................. 705/26

(Continued)

FOREIGN PATENT DOCUMENTS

| CN | 1855843 A | 11/2006 |
| CN | 1960345 A | 5/2007 |
| CN | 1968103 A | 5/2007 |

OTHER PUBLICATIONS http://www.symantec.com/avcenter/reference/secure.instant.messaging.pdf "Securing Instant Messaging"—Symantec, Apr. 2010.*

(Continued)

*Primary Examiner* — Randy Scott
(74) *Attorney, Agent, or Firm* — Lee & Hayes, PLLC

(57) ABSTRACT

An instant messaging system may be used to allow an auxiliary account to log in and manage an online shop of a primary account user. The primary account user creates an online shop in an online shop server, and associates itself with one or more auxiliary accounts in an instant messaging system. Upon authorization by primary account user to allow an auxiliary account to manage the online shop, the system records an authorization relation between the auxiliary account and the primary account. The authorization relation may be recorded in the instant messaging system. Based on the recorded authorization relation, the system allows a user of the authorized auxiliary account to manage the online shop system through the instant messaging system. An instant messaging server serving for this purpose is also disclosed.

20 Claims, 4 Drawing Sheets

(56) References Cited

U.S. PATENT DOCUMENTS

| | | | |
|---|---|---|---|
| 2002/0174010 A1* | 11/2002 | Rice, III | 705/14 |
| 2002/0178087 A1* | 11/2002 | Henderson et al. | 705/26 |
| 2003/0018725 A1* | 1/2003 | Turner et al. | 709/206 |
| 2005/0097000 A1* | 5/2005 | Freishtat et al. | 705/26 |
| 2005/0125308 A1* | 6/2005 | Puentes et al. | 705/26 |
| 2005/0228723 A1* | 10/2005 | Malik | 705/26 |
| 2006/0122899 A1* | 6/2006 | Lee et al. | 705/26 |
| 2007/0244758 A1* | 10/2007 | Xie | 705/14 |

OTHER PUBLICATIONS

Japanese Office Action mailed Feb. 8, 2013 for Japanese patent application No. 2010-544449, a counterpart foreign application of U.S. Appl. No. 12/599,029, 8 pages.

Extended European Search Report mailed Sep. 12, 2013 for European patent application No. 09703218.9, 6 pages.

PCT Search Report mailed Mar. 10, 2009 for PCT application No. PCT/US09/31871, 10 pages.

* cited by examiner

MANAGING ONLINE SHOP USING INSTANT MESSAGING SYSTEM

RELATED APPLICATIONS

The present application is a National Stage application of an International Patent Application PCT/US09/31871, filed Jan. 23, 2009, and entitled "MANAGING ONLINE SHOP USING INSTANT MESSAGING SYSTEM", which claims priority benefit from the Chinese patent application No. 200810002793.5, filed Jan. 23, 2008, entitled "INSTANT MESSAGING SYSTEM AND METHOD AND SYSTEM FOR MANAGING ONLINE SHOP", which applications are hereby incorporated in their entirety by reference.

TECHNICAL FIELD

The present disclosure relates to the fields of electronic commerce technologies, and particularly to methods and systems for managing an online shop.

BACKGROUND

In an existing e-commerce system, a user may open a shop on the Internet, log in and manage the online shop through a registered account. Through this account for logging in and managing the online shop, the user may also log in an instant messaging system (IM), such as AliWangWang, to communicate with a buyer, and create one or more auxiliary accounts with corresponding passwords in the instant messaging system. Users of the auxiliary accounts can also communicate with buyers who conduct businesses with the online shop.

If a user creates an account for an online shop, the account is saved in an online shop server, such as a server at the e-commerce site TaoBao.com. As the user logs in a related instant messaging server such as AliWangWang associated with TaoBao.com, the instant messaging server requests the online shop server of TaoBao.com to check the user's account name and password, and allows the user to log into AliWangWang upon successful verification. On the other hand, since an auxiliary account is created on the instant messaging system AliWangWang and is only saved in an IM server of AliWangWang, a user of the auxiliary account is unable to log into the online shop server of TaoBao.com.

In general, if one or more auxiliary accounts are created from an account S, the account S is referred to be "primary account", while the auxiliary accounts may serve the primary account. Users of these auxiliary accounts, however, are only allowed to log into IM, but not into the online shop system. As a result, the users of the auxiliary accounts in the existing systems cannot log in and manage the online shop established by a primary account user.

SUMMARY

The present disclosure provides an instant messaging system, and a method and a system for managing an online shop to allow a user of an auxiliary account in the instant messaging system to log in and manage an online shop created by a primary account user.

One aspect of the present disclosure provides a method for managing an online shop. The online shop is created on an online shop server, in association with a primary account user of a primary account. An auxiliary account associated with the primary account is also created in an instant messaging system. The method allows the primary account user to authorize the auxiliary account to manage the online shop, and records an authorization relation between the auxiliary account and the primary account. The method then allows the authorized auxiliary account to carry out a managing operation on the online shop through the instant messaging system, based on the recorded authorization relation.

In one embodiment, the authorization relation is recorded in the instant messaging system. In one embodiment, the primary account is also created in the instant messaging system, and the auxiliary account is created in the instant messaging system in association with the primary account. The auxiliary account may be created in the instant messaging system by the primary account user.

Another aspect of the present disclosure provides a system for managing an online shop which includes an online shop server hosting an online shop created by a primary account user; and an instant messaging system having a primary account and an auxiliary account. The instant messaging system is adapted for receiving an authorization given by the primary account for the auxiliary account to manage the online shop, recording an authorization relation between the auxiliary account and the primary account, and allowing the authorized auxiliary account to manage the online shop according to the recorded authorization relation.

Another aspect of the present disclosure is an instant messaging system which includes an authorization unit and a management unit. The authorization unit is used for allowing the primary account to authorize the auxiliary account to manage an online shop owned by the primary account, and recording an authorization relation between the auxiliary account and the primary account user. The management unit is used for allowing the authorized auxiliary account to manage the online shop according to the authorization relation.

In some exemplary embodiments of the present disclosure, a primary account user creates an online shop on an online shop server, and further creates one or more auxiliary accounts in an instant messaging system. The primary account user authorizes the auxiliary account to manage the online shop. The authorization relation between the auxiliary account and the primary accounts is recorded in the instant messaging system. The auxiliary account then performs managing operations on the online shop through the instant messaging system, based on the authorization relation recorded in the instant messaging system. Using this technical scheme, the auxiliary account is not only able to log in the instant messaging system to communicate with a buyer, but can also take the place of the primary account user to manage the online shop created by the primary account user on the online shop server, thus reducing the workload of the primary account user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. The use of the same reference numbers in different figures indicates similar or identical items.

DETAILED DESCRIPTION

Figure 1:
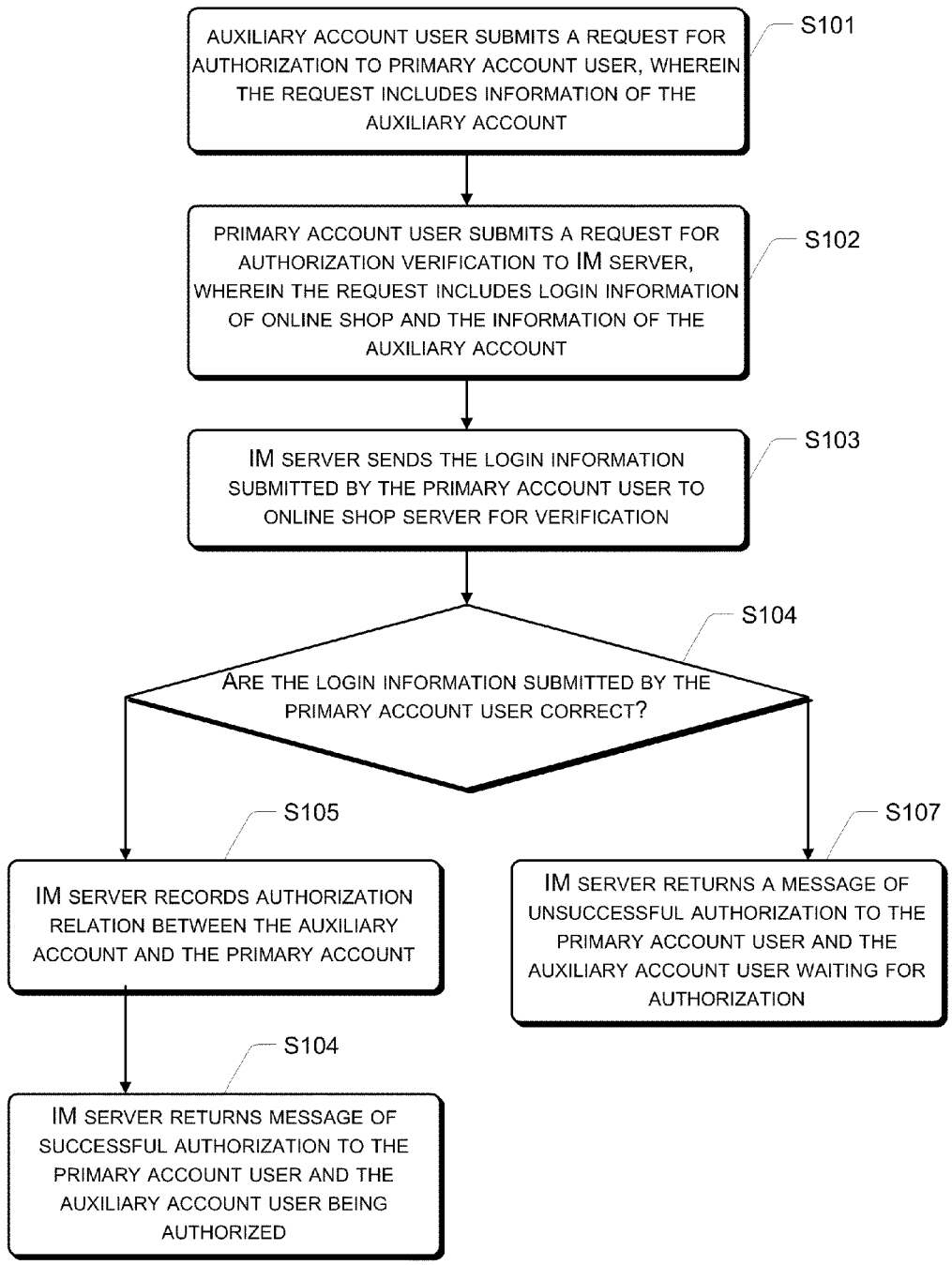
FIG. 1 shows a flow chart illustrating how an auxiliary account is authorized to manage an online shop of a primary account user in accordance with the exemplary embodiments of the present disclosure.

The present disclosure provides an instant messaging system, and a method and a system for managing an online shop to allow a user of an auxiliary account in the instant messaging system to log in and manage an online shop created by a primary account user. The primary account user may be an owner of the online shop carrying products for various sellers, and each seller may be a user of an auxiliary account created in association with the primary account.

In the exemplary embodiments of the present disclosure, a primary account user may log into an IM system, e.g., AliWangWang. At the same time, if the same user has applied to create an online shop (e.g., a TaoBao shop on TaoBao.com), the primary account user may also log into the online shop to manage the online shop.

In general, if one or more auxiliary accounts S1, S2, ..., Sn are created from an account S, the account S becomes a primary account. A user of the auxiliary account may log into the IM system and provide a service to the primary account user. In this sense, the primary account user acts like "a boss" while the auxiliary account plays the role of "an assistant". The auxiliary accounts may be created by the primary account user, but may also be created in different manners, such as by the auxiliary account users, or by the IM system. In order for an auxiliary account to provide service to the primary account, however, the auxiliary account generally needs to be associated with the primary account.

The present system and method is provided in response to a need for a user (e.g., a seller) of an auxiliary account to manage the online shop of the primary account user. For example, the user of an auxiliary account may need to modify the price of a product and/or the shipping cost of a product, or provide a rating for a product.

In practice, a user first creates an online shop on an online shop server. A primary account is also created on an instant messaging system connected to the online shop server for the user to manage the online shop and conduct related businesses. The user becomes a primary account user of the primary account, which is associated with the online shop. One or more auxiliary accounts associated with the primary account may be created in the instant messaging system. At this point, both the primary account user and the auxiliary account users may communicate with customers (e.g., buyers) of the online shop, but only the primary account user can log on and manage the online shop through the primary account.

The primary account user then authorizes an auxiliary account for its user to manage the online shop. Both the authorization and the management may be done through the instant messaging system. The system records an authorization relation between the auxiliary account and the primary account, and allows the user of the auxiliary account to conduct a managing operation on the online shop based on the recorded authorization relation. In one embodiment, the auxiliary account user conducts managing operation on the online shop through the instant messaging system, which stores the authorization relations. The authorization relation may also be stored in other parts of the system, such as the online shop server, or a separate server or storage system, and communicated to the instant messaging system when needed.

Combined with accompanying figures, an exemplary method for managing an online shop in the present disclosure is described below. In this description, the order in which a process is described is not intended to be construed as a limitation, and any number of the described process blocks may be combined in any order to implement the method, or an alternate method.

FIG. 1 shows a flow chart illustrating how an auxiliary account is authorized to manage an online shop of a primary account user in accordance with the exemplary embodiments of the present disclosure. As shown in FIG. 1, an exemplary embodiment of the method for authorizing an auxiliary account to manage an online shop of a primary account user is illustrated as follows.

At S101, user of an auxiliary account submits a request for authorization to a primary account through a terminal of an instant messaging (IM) server in an IM system. The request includes information of the auxiliary account (e.g., account name and/or password of the auxiliary account).

At S102, based on the request from the auxiliary account, the primary account user submits a request for authorization verification to an IM server through an IM terminal. The request includes login information of the online shop and the information of the auxiliary account. The login information of the online shop may include an account name and a password used by the primary account user for login and management of the online shop.

At S103, the IM server sends the login information submitted by the primary account user to an online shop server on which the online shop has been created for verification.

At S104, based upon the login information of the primary account user stored in the online shop server, the online shop server verifies the correctness of the login information submitted by the primary account user through the IM server. If successfully verified, the process continues to S105. Otherwise, the process proceeds to S107.

At S105, the IM server records an authorization relation between the auxiliary account and the primary account user. Specifically, the IM server considers the auxiliary account to be an account authorized for logging in the online shop of the primary account user.

At S106, the IM server returns a message of successful authorization to the primary account user and the auxiliary account being authorized through the respective IM terminals.

At S107, the IM server returns a message of unsuccessful authorization to the primary account user and the auxiliary account waiting for authorization through the respective IM terminals.

It is noted that the authorization given to a particular auxiliary account may either be an unrestricted authorization having identical privileges to that of the primary account user, or a limited authorization defined by the primary account user. For example, the same login information (e.g., the account name and password) used by the primary account user to logon the online shop may be given to the auxiliary account user for an unrestricted authorization. Alternatively, login information of a limited account may be given to the auxiliary account user for limited operations on the online shop. Such limited authorization may be customized for each auxiliary account, which may correspond to a seller of a certain category of products using the online shop, for instance. In the following, the process is further illustrated assuming that a generic authorization is given. But the description is equally applicable to applications where limited authorization or customized authorization is given.

Figure 2:
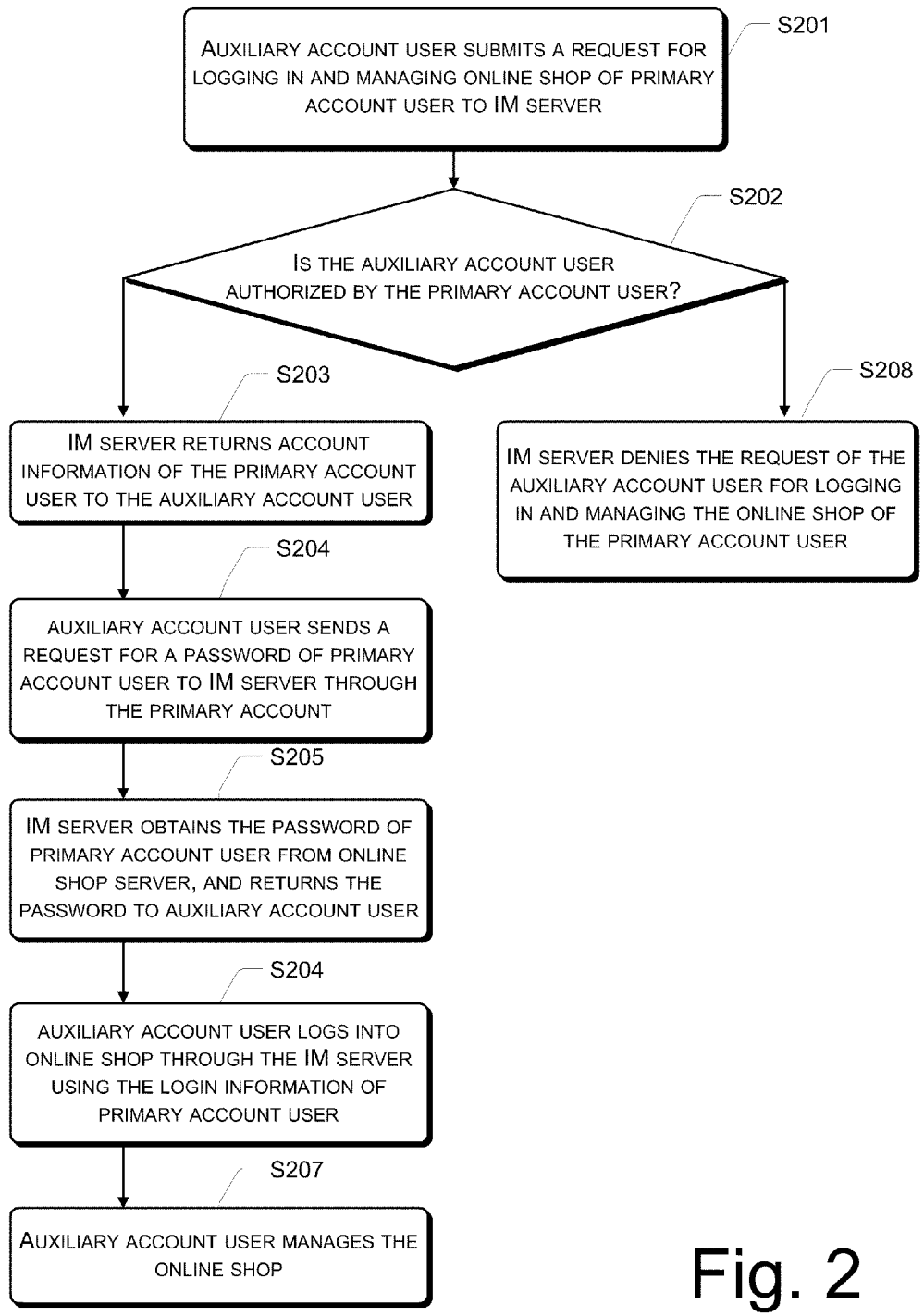
FIG. 2 shows a flow chart illustrating how an authorized auxiliary account logs in and manages an online shop of a primary account user in accordance with the exemplary embodiments of the present disclosure.

FIG. 2 shows a flow chart illustrating how an authorized auxiliary account logs in and manages an online shop of a primary account user. Specifically, after establishing authorization to an auxiliary account, the process may precede as follows.

At S201, the auxiliary account user submits a request for logging in and managing the online shop of the primary account user to the IM server.

At S202, based on the recorded authorization relation, the IM server determines whether the auxiliary account (or the auxiliary account user) is authorized by the primary account user to manage the online shop. If authorized, the process continues to S203. Otherwise, the process proceeds to S208.

At S203, the IM server sends the account information (e.g., account number or account name) of the primary account user to the auxiliary account user.

At S204, the auxiliary account user sends a request for the password of the primary account user to the IM server. With the account information of the primary account user, the auxiliary account user may act as the primary account user and sends the request through the primary account. In a preferred embodiment, this is done through the IM server.

At S205, the IM server obtains the password of the primary account user from the online shop server and returns the password to the auxiliary account. The password may be returned to the auxiliary account explicitly, or be given to the auxiliary account in an encrypted form which is recognized by the system only for the present login. In this latter case, the logon process may be automatically handled by the system upon meeting of the authorization conditions, and the actual login information concealed from the auxiliary account user.

At S206, a user of the auxiliary account logs in the online shop of the primary account user using the account information and the password of the primary account user. In a preferred embodiment, this is done through the IM server while the auxiliary account user remains on the client side user interface of the IM server, without leaving the IM and separately logging in the online shop through the client-side of the online shop server.

At S207, the auxiliary account manages the online shop.

At S208, the IM server denies the request of the auxiliary account for logging in the online shop of the primary account user.

It is noted that steps S203, S204 and S205 are used for providing to the auxiliary account user needed login information of the online shop. The above described procedure is only an example to accomplish this. Other methods may be used to accomplish the same result based on an existing authorization relation. For example, the IE server may retain the online shop login information provided by the primary account user when establishing the authorization relation between the auxiliary account at the primary account (e.g., S102 of FIG. 1). In this case, the IE server may provide the retained online shop login information to the auxiliary account user without further requesting the online shop server. As previously described, although the same login information used by the primary account user for an unrestricted login to the online shop may be provided to be auxiliary account user, any other desired forms of limited or customized authorization may be used.

An exemplary system for disclosed online shop management is described below.

Figure 3:
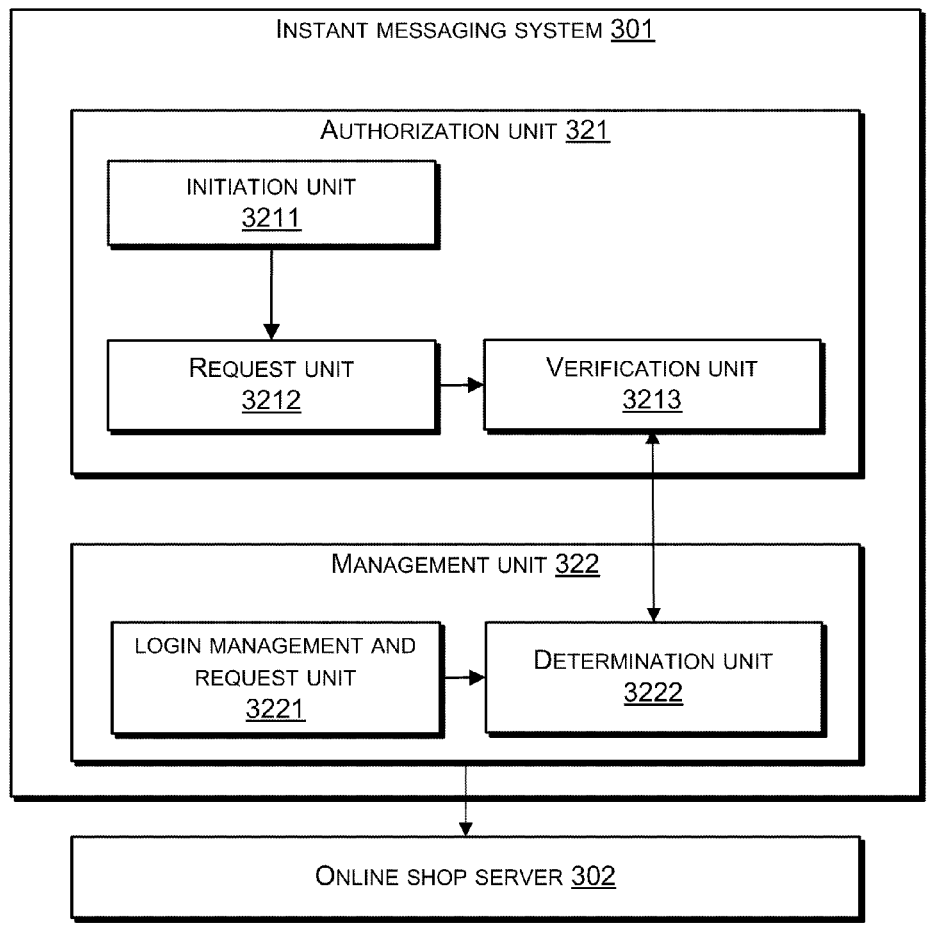
FIG. 3 shows a schematic structural diagram of an exemplary system for managing an online shop.

FIG. 3 shows a schematic structural diagram of an exemplary system for managing an online shop in accordance with the present disclosure. As shown in FIG. 3, system 300 for managing an online shop includes an instant messaging system 301 and an online shop server 302. The online shop server 302 is used for storing an online shop created by a primary account user. The instant messaging system 301 includes multiple user accounts such as a primary account and an associated auxiliary account, and facilitates instant messaging communication between the user accounts.

The instant messaging system 301 is further used to receive authorization given by the primary account for the auxiliary account to manage an online shop owned by the primary account, record authorization relation between the auxiliary account and the primary account, and allow the authorized auxiliary account to manage the online shop according to the recorded authorization relation.

Preferably, the instant messaging system 301 may include an authorization unit 321, used for authorizing by the primary account user for the user of the auxiliary account to manage the online shop, and for recording the authorization relation between the auxiliary account and the primary account user; and a management unit 322 used for conducting a managing operation by the authorized auxiliary account on the online shop according to the recorded authorization relation.

Preferably, the authorization unit 321 may include an initiation unit 3211, a request unit 3212 and the verification unit 3213. The initiation unit 3211 is for receiving a request for authorization from the auxiliary account, and for initiating the request unit 3212 to submit the request for authorization verification by the primary account. The request unit 3212 is used for submitting a request for authorization verification by the primary account upon initiation by the initiation unit 3211. The request may include login information of the online shop, and information of the auxiliary account that waits for authorization. The verification unit 3213 is used for verifying the login information submitted by the primary account user, and recording an authorization relation between the auxiliary account and the primary account user upon successful verification.

In one embodiment, the verification unit 3213 sends the login information submitted by the primary account user to the online shop server 302 for verification, and receives a verification result returned from the online shop server 302. The online shop server 302 verifies the login information submitted by the primary account user by checking against the login information of the online shop stored therein, and returns the verification result to the verification unit 3213.

In one embodiment, the management unit 322 includes a login management and request unit 3221 used for sending a request of the auxiliary account for logging in and managing the online shop; and a determination unit 3222 used for determining whether the auxiliary account is authorized for managing the online shop based upon the recorded authorization relation, and for logging in the online shop using login information of the online shop if the auxiliary account is authorized, or denying the request if the auxiliary account is not authorized.

In one embodiment, the determination unit 3222 obtains the password of the primary account user from the online shop server 302 in order to allow the auxiliary account user to log in to the online shop.

In one embodiment, the initiation unit 3211, the request unit 3212 and the login management and request unit 3221 reside in the client end of the instant messaging system 301, while the verification unit 3213 and the determination unit 3222 are located in the server end of the instant messaging system 301.

The disclosed method and system can be implemented using either software or hardware only, but preferably should be implemented using a combination of software and hardware. The software can be stored in a storage media. The software may include instructions for one or more computer devices (such as servers) to execute the method described in the exemplary embodiments of the current disclosure.

Figure 4:
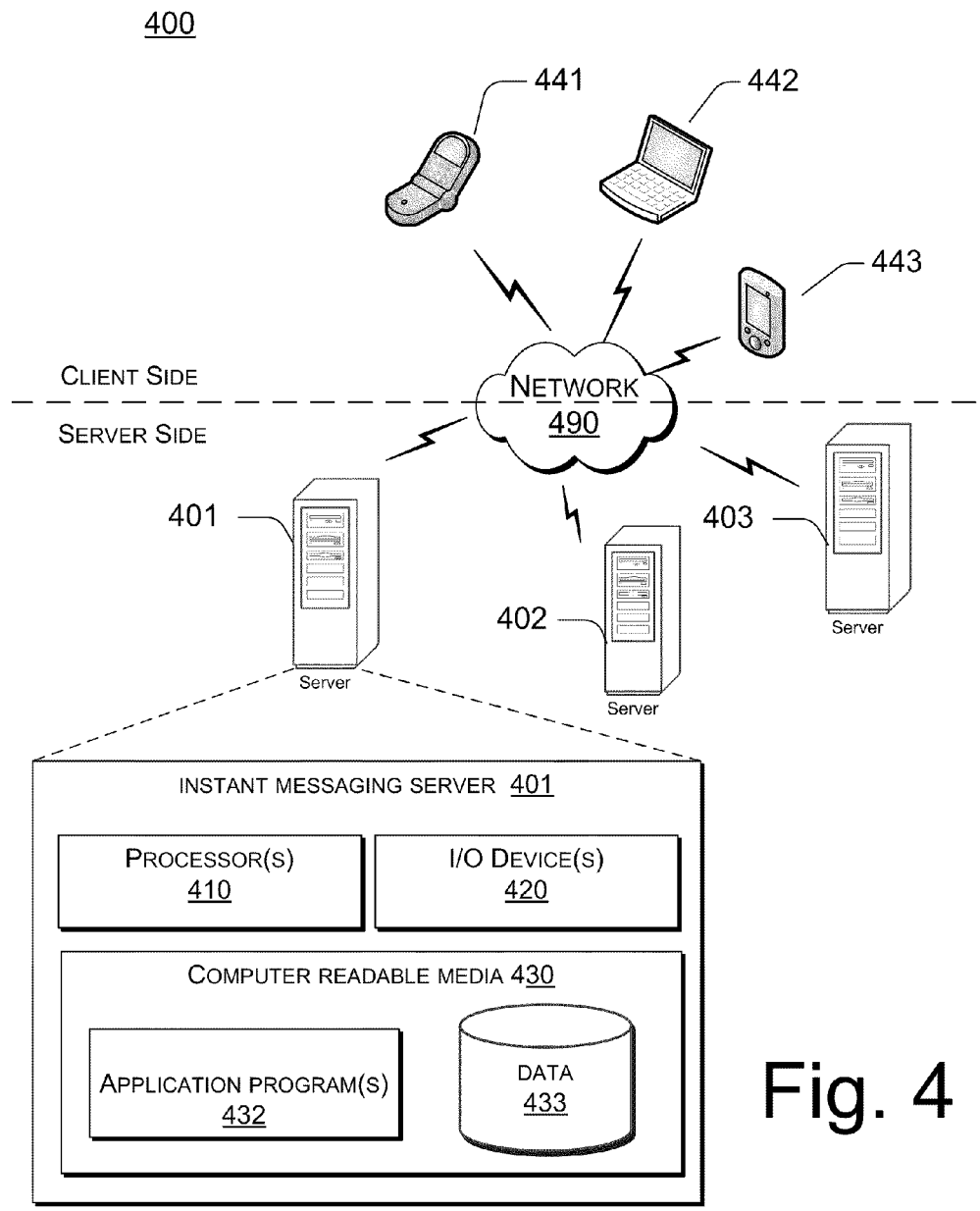
FIG. 4 shows an exemplary environment for implementing the method of the present disclosure.

FIG. 4 shows an exemplary environment for implementing the method of the present disclosure. In illustrated environment 400, some components reside on a client side and other components reside on a server side. However, these components may reside in multiple other locations. Furthermore, two or more of the illustrated components may combine to form a single component at a single location.

An instant messaging server 401, an online shop server 402, and an optional server 403 are on the server-side, and connected to client-side computing devices (client terminals) such as 441, 442 and 443 through network(s) 490. In one embodiment, the instant messaging server 401 and the online shop server 402 are each implemented in a server computer, while client-side computing devices 441, 442 and 443 may each be phone, a computer, or a portable device or a phone, used as a user communication terminal.

As illustrated, the instant messaging server 401 is implemented with a server which includes processor(s) 410, I/O devices 420, computer readable media 430, and network interface (not shown). The computer readable media 430 stores application program modules 432 and data 433 (such as user account information and authorization relations). Alternatively, at least some of data 434 may be stored in online shop server 402 and/or the optional server 403. Application program modules 432 contain instructions which, when executed by processor(s) 410, cause the processor(s) 410 to perform actions of a process described herein.

The online shop server 402 and the optional server 403 may each be implemented with a server with its own processor(s), I/O devices, network interface, and computer readable media storing application program modules. The servers of online shop server 402, the instant messaging server 401, and the optional server 403 work in cooperation for online shop management as described herein. It is noted that the instant messaging server 401, the online shop server 402, and the optional server 403 may each be implemented with any suitable computing device, and may each be implemented with multiple servers such as a cluster of servers. On the other hand, any of these systems may be combined into a server or a cluster of servers. For example, the instant messaging server 401 and the online shop server 402 may be combined as an integrated system implemented in one or more servers, and either or both may be further combined with the optional server 403. Any of these systems may be connected to form an LAN or a network under the same root domain. In one embodiment, the instant messaging server 401 and the online shop server 402 provide a centralized online shop management service to multiple users using instant messaging through the network 490.

It is appreciated that the computer readable media may be any of the suitable storage or memory devices for storing computer data. Such storage or memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

In summary, the exemplary embodiments of the present disclosure allow the authorized auxiliary account users to manage the online shop by authorizing users of one or more auxiliary accounts to manage an online shop of a primary account user through an instant messaging system. Unlike the primary account user who may login the online shop directly through the online shop server, the authorized auxiliary account users may login the online shop through the instant messaging server to perform management operations, and are not required to have the ability to login the online shop directly through the online shop server. Furthermore, the authorization may either be a full authorization equal to that of the primary account user, or a customized or limited authorization. The login to the online shop may either be based on explicit login information provided to the authorized auxiliary account user, or handled by the instant messaging system in a concealed manner by logging into the online shop automatically once the conditions of authorization is satisfied.

Using the disclosed method and system, an auxiliary account user not only can log into an instant messaging system to communicate with a buyer, but may also take the place of the primary account user to manage the online shop of the primary account user, thus alleviating the workload of the primary account user.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for managing an online shop, the method comprising:
    under control of one or more processors configured with executable instructions:
    creating an online shop on an online shop server for a primary account user of a primary account;
    creating an auxiliary account in an instant messaging system, wherein the auxiliary account is created in the instant messaging system by the primary account user;
    authorizing the auxiliary account to manage the online shop, and recording an authorization relation between the auxiliary account and the primary account; and
    based on the recorded authorization relation, allowing the auxiliary account to carry out a managing operation on the online shop through the instant messaging system.

2. The method as recited in claim 1, wherein the authorization relation is recorded in one or more of: the instant messaging system, the online shop server and a storage system communicated to the instant messaging system.

3. The method as recited in claim 1, wherein allowing the auxiliary account to carry out a managing operation on the online shop comprises:
    allowing a user of the auxiliary account to login to the online shop through the instant messaging system.

4. The method as recited in claim 1, wherein the primary account is created in the instant messaging system, and the auxiliary account is created in the instant messaging system in association with the primary account.

5. The method as recited in claim 1, wherein the instant messaging system comprises an instant messaging server connected to the online shop server.

6. The method as recited in claim 1, wherein authorizing the auxiliary account to manage the online shop comprises:
    sending a request for authorization verification from the primary account to the instant messaging system, wherein the request comprises online shop account information for logging in and managing the online shop, and auxiliary account information; and verifying the online shop account information submitted by the primary account user; and wherein recording the authorization relation between the auxiliary account and the primary account comprises:
  recording the authorization relation between the auxiliary account and the primary account upon successful verification by the instant messaging system.

7. The method as recited in claim 6, wherein the primary account sends the request for authorization verification to the instant messaging system upon receiving a request from the auxiliary account for authorization.

8. The method as recited in claim 6, wherein verifying the online shop account information comprises:
  sending the online shop account information to the online shop server; and
  verifying the online shop account information, and returning a verification result to the instant messaging system by the online shop server.

9. The method as recited in claim 1, wherein allowing the auxiliary account to carry out a managing operation on the online shop based on the recorded authorization relation comprises:
  receiving at the instant messaging system a request of the auxiliary account for logging in and managing the online shop;
  determining by the instant messaging system whether the auxiliary account is authorized to manage the online shop based upon the recorded authorization relation; and
  if authorized, allowing the auxiliary account to log in the online shop through the instant messaging system, and if not authorized, denying the request of the auxiliary account.

10. The method as recited in claim 9, wherein the instant messaging system receives login information of the online shop from the online shop server to allow the auxiliary account to log in the online shop.

11. The method as recited in claim 10, wherein the login information of the online shop account information includes an account name and a password of the primary account.

12. A method for managing an online shop, the method comprising:
  under control of one or more processors configured with executable instructions:
  creating an online shop on an online shop server for a primary account user of a primary account;
  creating an auxiliary account in an instant messaging system;
  authorizing the auxiliary account to manage the online shop, and recording an authorization relation between the auxiliary account and the primary account; and
  based on the recorded authorization relation, allowing the auxiliary account to carry out a managing operation on the online shop through the instant messaging system, the allowing comprising:
    determining whether the auxiliary account is authorized by the primary account user to manage the online shop;
    in response to determining that the auxiliary account is authorized by the primary account user to manage the online shop, sending account information of the primary account user to a user of the auxiliary account;
    receiving a request for a password of the primary account user from the user of the auxiliary account; and
    returning the password of the primary account user to the auxiliary account.

13. A memory device storing executable instructions that, when executed by one or more processors, cause the one or more processors to perform acts comprising:
  creating an auxiliary account in an instant messaging system;
  authorizing the auxiliary account to manage an online shop that is created on an online shop server for a primary account, the authorizing comprising:
    receiving a request for authorization verification from the primary account at the instant messaging system, wherein the request comprises online shop account information for logging in and managing the online shop, and auxiliary account information; and
    verifying the online shop account information submitted from the primary account;
  recording an authorization relation between the auxiliary account and the primary account, the recording comprising recording the authorization relation between the auxiliary account and the primary account upon successful verification by the instant messaging system; and
  based on the recorded authorization relation, allowing the auxiliary account to carry out a managing operation on the online shop through the instant messaging system.

14. The memory device as recited in claim 13, wherein the authorization relation is further recorded in one or more of: the online shop server and a storage system communicated to the instant messaging system.

15. The memory device as recited in claim 13, wherein allowing the auxiliary account to carry out a managing operation on the online shop comprises:
  allowing a user of the auxiliary account to login to the online shop through the instant messaging system.

16. The memory device as recited in claim 13, wherein the auxiliary account is created in the instant messaging system by a user of the primary account.

17. The memory device as recited in claim 13, wherein the primary account sends the request for authorization verification to the instant messaging system upon receiving a request from the auxiliary account for authorization.

18. The memory device as recited in claim 13, wherein verifying the online shop account information comprises:
  sending the online shop account information to the online shop server; and
  receiving a verification result at the instant messaging system from the online shop server.

19. The memory device as recited in claim 13, wherein allowing the auxiliary account to carry out a managing operation on the online shop based on the recorded authorization relation comprises:
  receiving at the instant messaging system a request of the auxiliary account for logging in and managing the online shop;
  determining by the instant messaging system whether the auxiliary account is authorized to manage the online shop based upon the recorded authorization relation; and
  if authorized, allowing the auxiliary account to log in the online shop through the instant messaging system, and if not authorized, denying the request of the auxiliary account.

20. The memory device as recited in claim 13, wherein the instant messaging system comprises an instant messaging server connected to the online shop server.

* * * * *